United States Patent [19]

Sagara et al.

[11] Patent Number: 4,992,964
[45] Date of Patent: Feb. 12, 1991

[54] CONTROL APPARATUS AND METHOD FOR PREVENTING SEIZURE IN A SPINDLE APPARATUS OF A MACHINE TOOL

[75] Inventors: Norio Sagara; Shinya Nakamura, both of Maebashi, Japan

[73] Assignee: Nippon Seiko Kabushiki Kaisha, Tokyo, Japan

[21] Appl. No.: 227,736

[22] Filed: Aug. 3, 1988

[30] Foreign Application Priority Data

Aug. 4, 1987 [JP] Japan .................................. 62-118931

[51] Int. Cl.$^5$ ............................................. G06F 15/20
[52] U.S. Cl. .................................... 364/550; 73/660; 73/862.33; 364/506; 364/508; 364/551.01
[58] Field of Search ............... 364/550, 562, 506, 505, 364/508, 551.01, 551.02; 73/462, 468, 862.33, 9, 10, 581, 660, 847, 862.49; 173/10, 11, 12, 13, 21, 167

[56] References Cited

U.S. PATENT DOCUMENTS

| 3,729,991 | 5/1973 | Hardway, Jr. | 73/862.33 |
| 3,888,116 | 6/1975 | Spinella | 73/862.33 |
| 4,270,041 | 5/1981 | Pleyber | 364/550 |
| 4,446,746 | 5/1984 | Aoshima et al. | 73/862.33 |
| 4,625,291 | 11/1986 | Hermann | 364/550 |
| 4,637,264 | 1/1987 | Takahashi et al. | 73/862.33 |
| 4,672,566 | 6/1987 | Asano et al. | 364/550 |

FOREIGN PATENT DOCUMENTS 144880 12/1977 Japan .
1477 1/1979 Japan .
57144 12/1986 Japan .

*Primary Examiner*—Kevin J. Teska

[57] ABSTRACT

A control device for a spindle apparatus including a spindle in a housing supported by bearings includes a sensor that senses the axial elongation of the spindle during rotation and outputs monitoring signals representing whether such an elongation exists. The monitored signals are compared and a variation value per unit time is calculated. A switching circuit receives the variation value and stops rotation of the spindle when the variation value is equal to or greater than a preset reference value by detecting abrupt elongation in the axial direction of the spindle immediately before seizure may happen and rapidly stopping rotation of the spindle to prevent seizure of the spindle.

14 Claims, 3 Drawing Sheets

CONTROL APPARATUS AND METHOD FOR PREVENTING SEIZURE IN A SPINDLE APPARATUS OF A MACHINE TOOL

BACKGROUND OF THE INVENTION

1. Technical Field of the Invention

The present invention relates to a spindle apparatus of a machine tool or more particularly to a spindle apparatus equipped with a control apparatus for preventing seizure.

2. Prior Art

When a spindle apparatus of a fixed position and pressurized type supported by rolling bearings is operated at a rotational speed higher than 1 million $d_m n$ [$d_m n$ signifies the product of the diametral pitch of rolling elements $d_m$ (mm) and the rotational speed (rpm)], the clearance in the bearings may be reduced due to expansion of the inner race of the bearing, the temperature difference between the inner race and the outer race and the like. As a result, the prestress of the bearing will be increased causing seizure when the conditions of supplying lubricants and cooling the bearings cannot comply with said increase in prestress. Method used to eliminate this problem, consist mainly of measuring the temperature of the housing and predicting the possibility of seizure in accordance with the result of said measurement and a method of predicting possible seizure by used of acoustic emission (AE).

However, there have been problems in that the response to prediction of seizure based on the measurement of the temperature of the housing was so delayed that seizure might have happened by the time such seizure prediction data was detected, thus making prevention of seizure not reliable. Particularly recently, since the housing is cooled by means of a jacket, the above-mentioned method based on temperature detection has been made difficult. Also the method of predicting seizure by use of acoustic emission (AE) has been made difficult in the case where a housing is cooled by means of a jacket because a sensor is provided with a housing and detects the states thereof. There is still another problem in that the method of predicting seizure by use of acoustic emission (AE) is as yet unreliable for practical use.

SUMMARY OF THE INVENTION

One object of the present invention is in general to eliminate the problems above-mentioned.

Another object of the present invention is to provide an improved control apparatus and an improved method of control for positively preventing seizure at the spindle apparatus of a machine tool adapted to support the spindle in a housing by way of a bearing.

A further object of the present invention is to provide an improved spindle apparatus having an apparatus adapted to control the rotational speed of a spindle, thereby enabling the spindle to be carried by a housing through bearings and to rotate at a high speed, and which is capable of rapidly and positively stopping rotation of the spindle before seizure happens during rotation of the spindle.

According to one feature of the present invention, the inventive control apparatus adapted to prevent seizure at the spindle apparatus for supporting the spindle in a housing by way of bearings comprises a means adapted to monitor the axial elongation of said spindle during rotation and output monitoring signals indicating whether such an elongation exists, a means adapted to receive such monitoring signals and calculate a variation value of elongation for a specified period time in said monitoring signal, and a means adapted to receive said variation value and stop rotation of said spindle when said variation value is equal to or higher than a preset reference value. According to an embodiment of the present invention, said spindle is provided with a projection and a non-contact displacement sensor is disposed oppositely to said projection of the spindle so as to monitor the axial elongation of said spindle and output a monitoring signal indicating whether such an elongation exists. Said monitoring signals are sampled in specified time intervals and the values obtained at the time of respective sampling are outputted. For said respective sampling, the difference between the value taken at the latest sampling and the value obtained at the sampling immediately before the latest sampling is calculated. In the mean time, the reference value for controlling rotation of a spindle is preset and said difference of the sampling values is compared to said reference value. A decision is then made as to whether said difference is equal to said reference value. When it is decided that said difference is equal to or higher than said reference value, rotation of said spindle is caused to stop. It is noted that said bearings are preferably ball or roller bearings.

The above-mentioned and other objects and features of the present invention will be apparent from the following explanation taken in accordance with the accompanying drawings and novel aspects pointed out in the appended claims.

DETAILED DESCRIPTION OF PREFERRED EMBODIMENTS

The spindle supported in a housing by way of bearings is rapidly expanded in the axial direction when it is rotated at a high speed before seizure is caused. In order to prevent seizure therefore, it is only necessary to constantly monitor the axial elongation of the spindle and to stop rotation of the spindle when elongation of a value higher than a predetermined value is detected. The present invention has been conceived on the basis of this knowledge so as to prevent seizure at the spindle. More specifically, a projection is provided at the spindle and a non-contact displacement sensor is disposed in a housing oppositely to said projection, whereby the clearance between said non-contact displacement sensor and said projection is constantly monitored by said non-contact displacement sensor during rotation of the spindle. Since if the spindle is rapidly elongated in the axial direction, said clearance is also rapidly varied, rotation of the spindle is stopped when it is detected that the variation value of said clearance has reached a specified value.

Figure 1:
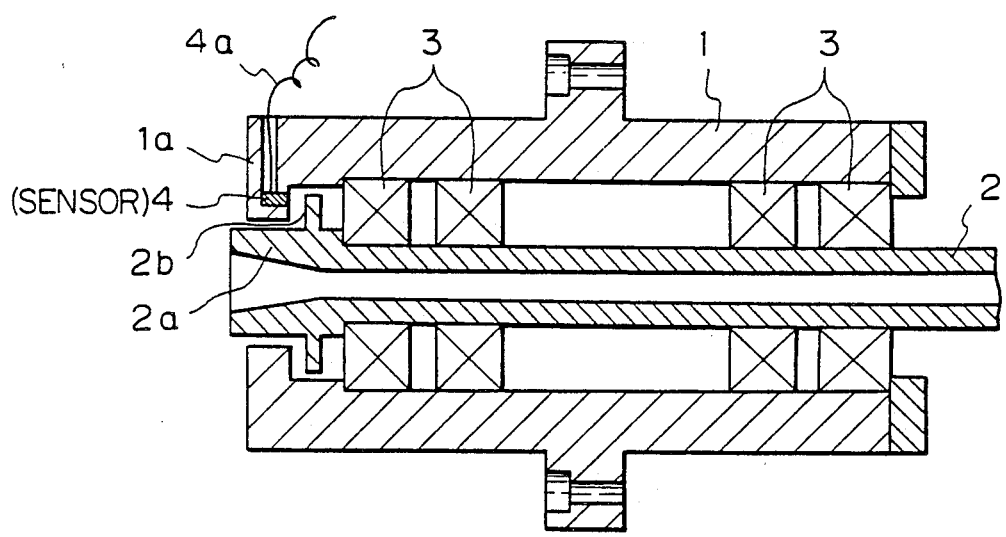
FIG. 1 is a sectional view of a bearing part in an embodiment of the spindle apparatus according to the present invention.
Figure 2:
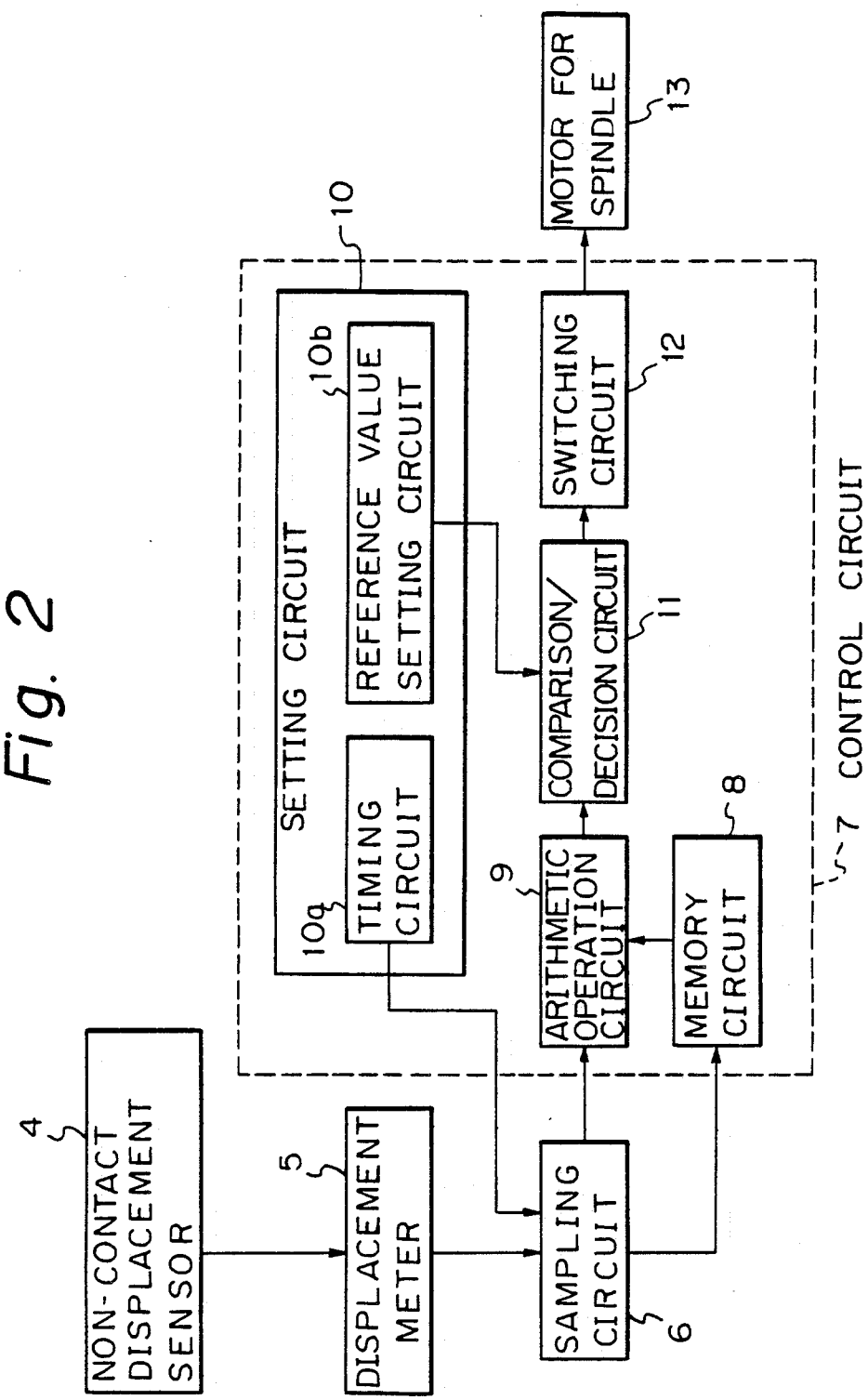
FIG. 2 is a block diagram of an embodiment of the control circuit for the spindle apparatus according to the present invention.

An embodiment of the present invention will now be explained by referring to FIG. 1 and FIG. 2. In FIG. 1, the spindle 2 is rotatably supported in a housing 1 by way of ball bearings 3. A projection 2b is provided at one end 2a of said spindle 2 and a non-contact sensor 4 is provided at one end 1a of the housing 1 supporting one end of said spindle 2 opposedly to said projection 2b of the spindle 2. One end of the lead wire 4a is connected to the non-contact displacement sensor 4 and the other end of said lead wire 4a is connected to a displacement meter 5 shown in FIG. 2. Said non-contact displacement sensor 4 is adapted to cooperate with the projection 2b of the spindle 2 so as to constantly monitor the axial elongation of the spindle 2 during rotation and output via the lead wire 4a the monitoring signals indicating whether such an elongation exists to the displacement meter 5. For said non-contact displacement sensor 4, there is commercially available a non-contact displacement sensor of electrostatic capacity type such as 3D46A Type, Micro Sense Type No. manufactured by ADE Corporation. In FIG. 2, the displacement meter 5 is adapted to receive the monitoring signal output from the non-contact displacement sensor 4, convert the monitoring signal to a corresponding electric signal and output said electric signal to the sampling circuit 6. The sampling circuit 6 is adapted to sample the electric signals received from the displacement meter 5 at specified time intervals and convert the sampling values representing said monitoring signals into digital signals through analog-to-digital (A/D) conversion. The circuit 6 is adapted to output the digital signals corresponding to said sampling values to the control circuit 7 at the respective time of sampling. The control circuit 7 consists of a memory circuit 8, an arithmetic operation circuit 9, a setting circuit 10, a comparison/decision circuit 11 and a switching circuit 12. The setting circuit 10 comprises a timing circuit 10a and a reference value setting circuit 10b. The timing circuit 10a is adapted to generate timing signals for setting specified time intervals for said sampling and output the timing signals to the sampling circuit 6. The memory circuit 8 is adapted to receive and store the digital value D(n) at the latest sampling interval for each sampling from the sampling circuit 6 and outputs to the arithmetic operation circuit 9 the digital value D(n−1) at the sampling immediately before the latest sampling. The arithmetic operation circuit 9 is adapted to calculate for each sampling the difference $\Delta D = D(n) - D(n-1)$ which represents the variation value of the monitoring signal between specified time intervals in accordance with the digital value D(n) at the latest sampling received from the sampling circuit 6 and the digital value D(n−1) at the sampling immediately before the latest sampling, received from the memory circuit 8, and output the result to the comparison/decision circuit 11. The reference value setting circuit 10b in the setting circuit 10 is capable of setting in advance the reference values, and the set reference value $\Delta Do$ is outputted to the comparison/decision circuit 11. Said comparison/decision circuit 11 is adapted to receive the difference $\Delta D$ representing the variation value of monitoring signals from the arithmetic operation circuit 9 for respective samplings and compare said difference $\Delta D$ with the reference value $\Delta Do$ provided by the reference value setting circuit 10b, whereby it will output a control signal to the switching circuit 12 when said difference $\Delta D$ is equal to or more than the reference value $\Delta Do$. The switching circuit 12 is operable only when it has received said control signal and will stop the motor 13 for the spindle.

Figure 3:
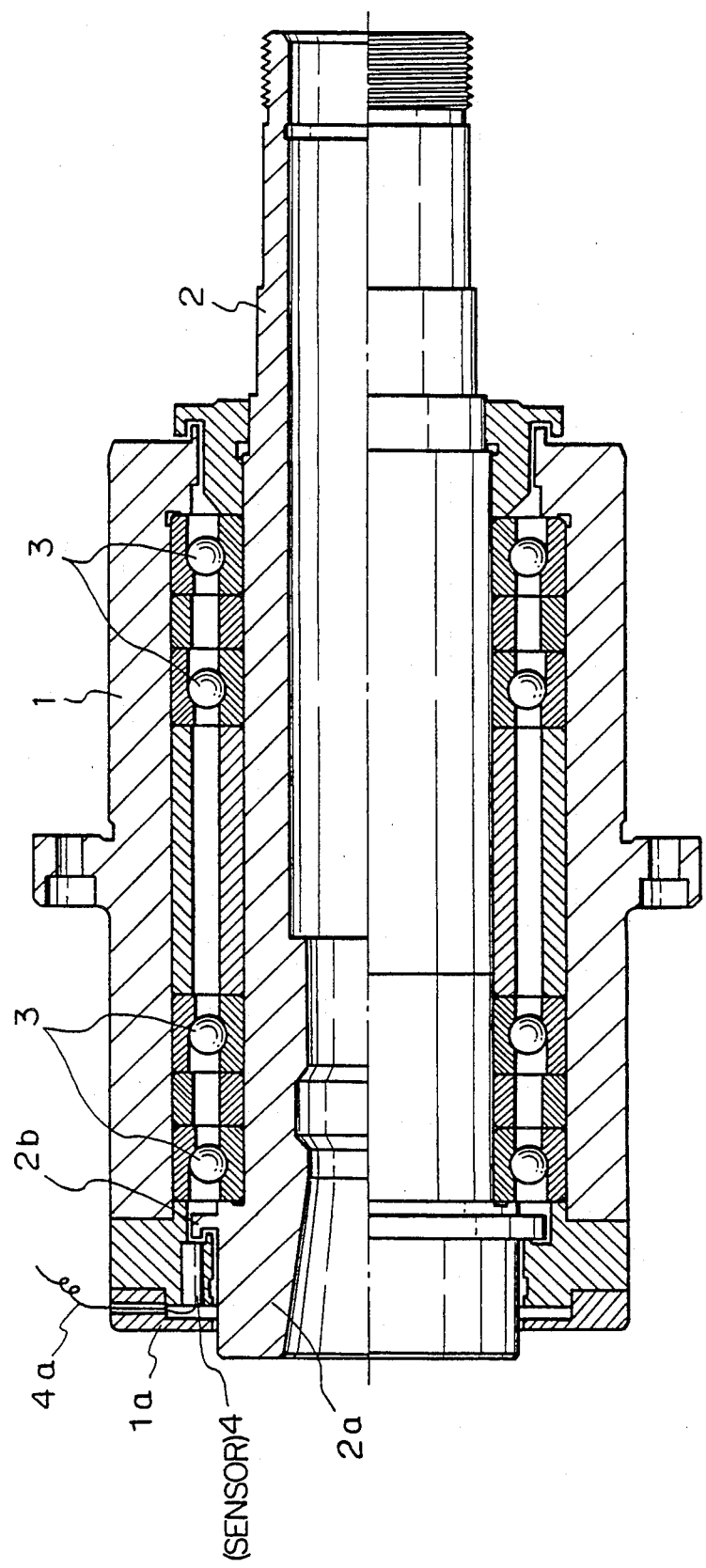
FIG. 3 is a sectional view of a bearing part in another embodiment of the spindle apparatus according to the present invention.

Further, FIG. 3 illustrates another more concrete embodiment of the spindle apparatus according to the invention. In FIG. 3, parts similar to those previously described with reference to FIG. 1 are denoted by the same reference numerals.

The apparatus and method of control according to the present invention are based on the characteristics in which the axial elongation of a spindle is abruptly increased immediately before seizure is caused at the spindle. Variation of elongation of a spindle in the axial direction is monitored at specified time intervals by the non-contact displacement sensor and the sampling circuit. The control circuit is adapted to detect that the variation value in respect of elongation has exceeded a specified value when the elongation of the spindle starts to abruptly increase. By means of this detection, it will be made possible to stop rotation of the spindle immediately before seizure happens, whereby seizure at the spindle may be rapidly and positively prevented in advance. It is also to be noted that the apparatus and method of control according to the present invention may be applied as well to the spindle apparatus of a jacket cooling type.

What is claimed is:

1. Apparatus for preventing seizure of a spindle rotatably supported in a housing by way of rolling bearings, said spindle having a characteristic of showing an elongation in the direction of the longitudinal axis thereof during rotation, said elongation being variable with respect to an amount of heat generated by the rotation of said spindle, said apparatus comprising:

means for sensing an amount of the elongation of said spindle during rotation and outputting a monitoring signal representing the amount of the elongation;

means for receiving said monitoring signal for calculating variation values in said monitoring signal at specified time intervals; and means for receiving said variation values for said specified time intervals and operable to stop the rotation of said spindle when one of said variation values is equal to or greater than a preset reference value which indicates that the seizure at said spindle is about to occur.

2. An apparatus as claimed in claim 1, wherein said rolling bearings are ball bearings.

3. Apparatus as claimed in claim 1, wherein said spindle includes a projection, and said means for monitoring an amount of the elongation of said spindle comprise a non-contact displacement sensor and is disposed in said housing opposed to said projection of the spindle to sense the displacement of said projection.

4. An apparatus as claimed in claim 3, wherein said rolling bearings are ball bearings.

5. An apparatus as claimed in claim 1, wherein said means operable to stop rotation of said spindle comprise a setting circuit means for setting and outputting said reference value, a comparison/decision means for comparing said variation values with said reference value to decide whether each of said variation values is equal to or greater than said reference value, and a switching circuit means connected to said comparison/decision means and operable to stop rotation of said spindle in response to one of said variation values being equal to or greater than said reference value.

6. An apparatus as claimed in claim 5, wherein said rolling bearings are ball bearings.

7. Apparatus as claimed in claim 1, wherein said means for calculating variation values comprise means for sampling said monitoring signal at said specified time intervals and for outputting the sampled values at respective sampling times, and an arithmetic operation means for calculating, at each of said specified time intervals, the difference between the sampled value at a current sampling time and the sampled value at a sampling time immediately prior said current sampling time.

8. An apparatus as claimed in claim 7, wherein said rolling bearings are ball bearings.

9. Apparatus as claimed in claim 7, wherein said means for outputting the sampled values comprise a conversion means for converting said monitoring signal to a corresponding electric signal, an A/D converter circuit means for sampling the converted electric signal at said specified time intervals and converting the sampled values of the electric signal into digital values and outputting said digital values, and a timing circuit means for generating timing pulses at said specified time intervals and outputting said timing pulses to said A/D converter circuit means.

10. An apparatus as claimed in claim 9, wherein said rolling bearings are ball bearings.

11. An apparatus for preventing seizure at a spindle rotatably supported in a housing by way of rolling bearings, said spindle having a characteristic of showing an elongation in the direction of the longitudinal axis thereof during rotation, said elongation being variable with respect to an amount of heat generated by the rotation of said spindle, said apparatus comprising:
   a generally radial projection provided on said spindle;
   a non-contact displacement sensor disposed in said housing opposed to said projection of the spindle for sensing a displacement of said projection relative to said sensor to detect an amount of the elongation of said spindle during rotation and outputting a monitoring signal representing the amount of the elongation;
   a conversion means for converting said monitoring signal to a corresponding electric signal;
   an A/D converter circuit operable to sample said electric signal at specified time intervals, convert the sampled values of said electric signal into digital values corresponding to said monitoring signal at the respective sampling points of time and output the digital values; and
   a control circuit for controlling the rotation of said spindle in accordance with the output from said sampling circuit, said control circuit comprising a timing circuit for generating timing pulses at said specified time intervals and outputting said timing to said A/D converter circuit, an arithmetic operation circuit for receiving ;the output from said A/D converter circuit and calculating, as variation values of said monitoring signal, the difference between the digital value at the current sampling time and the digital value at the sampling time immediately prior to said current sampling time, a comparison/decision circuit for comparing said variation values with a preset reference which indicates that the seizure at said spindle is about to occur, and for determining whether each of said variation values is equal to or greater than said reference value, and a switching circuit connected to said comparision/decision circuit and operable to stop rotation of said spindle in response to one of said variation values being equal to or greater than said reference value.

12. An apparatus comprising:
   a spindle having a characteristic of showing an elongation in the direction of the longitudinal axis thereof during rotation, said elongation being variable with respect to an amount of heat generated by the rotation of said spindle;
   a housing for rotatably supporting said spindle through rolling bearings;
   a projection provided on said spindle;
   a non-contact displacement sensor disposed in said housing opposed to said projection of the spindle, said displacement sensor being operable to monitor an amount of the elongation of said spindle to output a monitoring signal representing the amount of the elongation; and
   a control device for receiving said monitoring signal and capable of sampling said monitoring signal at specified time intervals, outputting the sampled values at the respective sampling times, calculating for each of the specified time intervals the difference between the sampled value at the latest sampling time and the sampled value at the sampling time immediately before the latest sampling time, and stopping rotation of said spindle when said difference is equal to or greater than a preset reference value which indicates that seizure at said spindle is about to occur, whereby said spindle may be prevented from seizure during rotation.

13. An apparatus as claimed in claim 12, wherein said rolling bearings are ball bearings.

14. A method for preventing seizure of a spindle rotatably supported in a housing by way of rolling bearings, said spindle having a characteristic elongation in the direction of the longitudinal axis thereof during rotation, said elongation being variable with respect to an amount of heat generated by the rotation of said spindle, wherein said spindle is provided with a projection and said housing includes a non-contact displacement sensor disposed therein opposed to said projection of said spindle, said method comprising the steps of:
   monitoring an amount of the elongation of said spindle during rotation of said spindle by said non-contact displacement sensor;
   outputting a monitoring signal representing the amount of the elongation;
   sampling said monitoring signal at specified sampling time intervals to generate the sampled values at respective sampling times;
   calculating at each of said specified sampling time intervals the difference between the sampled value at the latest sampling time and the sampled value at the sampling time immediately before the latest sampling time;
   comparing the difference with a preset reference value which indicates that the seizure at said spindle is about to occur; and
   stopping rotation of said spindle when said difference is equal to or greater than said preset reference value.

* * * * *

UNITED STATES PATENT AND TRADEMARK OFFICE
CERTIFICATE OF CORRECTION

PATENT NO. : 4,992,964
DATED : February 12, 1991
INVENTOR(S) : Norio Sagara and Shinya Nakamura It is certified that error appears in the above-identified patent and that said Letters Patent is hereby corrected as shown below:

COLUMN 5

Line 55, after "timing" please insert --pulses--.

Signed and Sealed this

Thirtieth Day of June, 1992

*Attest:*

DOUGLAS B. COMER

*Attesting Officer*     *Acting Commissioner of Patents and Trademarks*